Patented Dec. 31, 1935

2,026,150

UNITED STATES PATENT OFFICE 2,026,150

ANTHRAQUINONE VAT-DYESTUFF AND PROCESS OF MAKING SAME

Max Utzinger and Max Bommer, Riehen, near Basel, Switzerland, assignors to firm Society of Chemical Industry in Basle, Basel, Switzerland No Drawing. Application August 24, 1933, Serial No. 686,647. In Switzerland September 15, 1932

11 Claims. (Cl. 260—46)

It has been found that anthraquinone vat-dyestuffs may be obtained by treating 1-acylamino-8-halogenanthraquinones in a first step with halogenating agents, condensing in a second step 1 mol of the 1-acylamino-4,8-dihalogenanthraquinones thus obtained with 2 mols of a 1-aminoanthraquinone, and treating the products thus obtained in a third step with condensing agents.

1-acylamino-8-halogenanthraquinones which serve as parent materials for the invention are, for example, 1-benzoylamino-8-chloranthraquinone, 1-acetylamino-8-bromanthraquinone, 1-benzoylamino-8-bromanthraquinone, 1-(4'-chloro)-benzoylamino-8-chloranthraquinone, 1-carbethoxyamino-8-chloranthraquinone and 1-naphthoylamino-8-chloranthraquinone.

As examples of 1-aminoanthraquinones which may be condensed with the 1-acylamino-4,8-dihalogenanthraquinones, the following are mentioned:—1-aminoanthraquinone, 1-amino-4-benzoylaminoanthraquinone, 1-amino-5-benzoylaminoanthraquinone, 1-amino-4-(4'-chloro-) benzoylaminoanthraquinone and 1-aminoanthraquinone-4,3-acridone.

The treatment of the first step, i. e. the treatment of the 1-acylamino-8-halogenanthraquinones with halogenating agents, such as, for instance, chlorine, bromine or sulfuryl chloride may be effected in presence or absence of catalysts, such as, for example, iodine or ferric chloride. This treatment is preferably carried out in an indifferent solvent or diluent, such as, for example, nitrobenzene, dichlorobenzene or naphthalene.

The condensation of the second step, viz. the condensation of 1 mol of the 1-acylamino-4,8-dihalogenanthraquinone obtainable in the first step with 2 mols of an 1-aminoanthraquinone, that is to say with one mol each of among themselves different 1-aminoanthraquinones or with 2 mols of among themselves identical 1-aminoanthraquinones may occur at a raised temperature in presence of a solvent or diluent, for instance, nitrobenzene, dichlorobenzene or naphthalene, preferably in presence of agents that bind acids, and of copper or a salt thereof.

Suitable condensing agents for acting in the third step upon the products obtained by condensing 1 mol of 1-acylamino-4,8-dihalogenanthraquinone with 2 mols of an 1-aminoanthraquinone are, for example: chlorosulfonic acid or aluminium chloride in combination with ammonia or sodium chloride. Very good yields and particularly pure dyestuffs are obtained when aluminium chloride is used in combination with aromatic bases, such as, for example, pyridine, quinoline and dimethylaniline.

The anthraquinone vat-dyestuffs obtained according to the present process, corresponding to the probable general formula

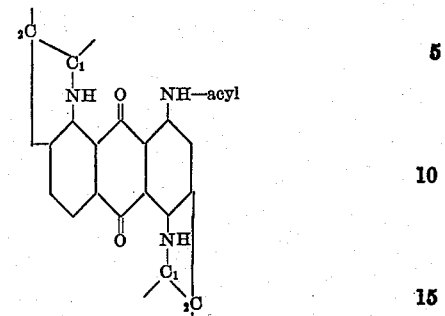

wherein the two carbon pairs $C_1$ $C_2$ belong to an anthraquinone nucleus each, represent dark colored powders dyeing cotton very fast brown to olive tints. They may be used as originally made or after further purification, for example by recrystallization or by treatment with oxidizing agents, such as, for instance, a solution of alkali hypochlorite. Further they may be treated with halogen or agents yielding halogen or may be converted by usual methods into leuco-ester salts.

The following examples illustrate the invention, the parts being by weight, unless otherwise stated:—

Example 1

100 parts of 1-benzoylamino-8-chloranthraquinone are suspended in 300 parts of nitrobenzene and to the suspension, at 50–60° C., there are added by drops 150 parts of sulfuryl chloride. After stirring for 20–24 hours at 60–70° C., the crystalline magma is filtered by suction and the crystals are washed with a little nitrobenzene and then with alcohol.

The 1-benzoylamino-4:8-dichloranthraquinone thus obtained of the formula

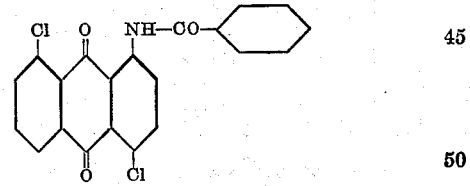

dissolves sparingly in boiling alcohol and in glacial acetic acid, but is very freely soluble in hot nitrobenzene from which it crystallizes in very slender yellow needles which melt at 213–214° C. They dissolve in concentrated sulfuric acid to a red color; when this sulfuric acid solution is heated to about 100° C. it becomes yellow and the benzoyl residue is dissolved from the compound.

A mixture of 15.9 parts of 1-benzoylamino-4,8- dichloranthraquinone, 20 parts of 1-aminoanthraquinone, 0.8 part of cupric acetate, 12 parts of anhydrous sodium acetate and 200 parts of naphthalene is heated to boiling for some hours in a reflux apparatus, and is then diluted gradually with about its own volume of chlorobenzene. Filtration at 70–80° C. follows and then washing with chlorobenzene, alcohol and water, whereafter the violet-brown needles thus obtained of the formula

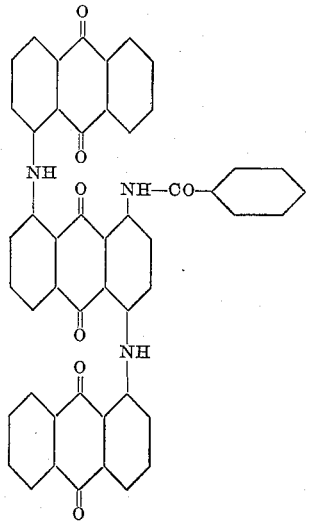

are dried.

10 parts of this condensation product are introduced, while stirring, into a mixture made, while cooling, from 30 parts of aluminium chloride and 30 parts of dry pyridine, the temperature of the mixture during introduction being 80–90° C.; this mixture is then maintained during 2 hours at 140–150° C. and the dark colored mass is then introduced into 1500 parts of water which have been made alkaline by addition of 150 parts by volume of caustic soda solution of 30 per cent. strength. At a temperature of 40° C. there are added 25 parts of sodium hydrosulfite and, after about ¼ hour the vat thus produced is filtered from a small quantity of impurities. By blowing air through the vat, the dyestuff of the probable formula

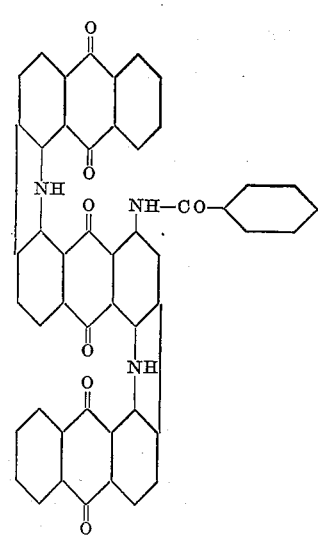

is precipitated; the filtered, washed and dried precipitate is a dark powder, which dyes cotton in the vat brown tints of excellent fastness. When the dyestuff has been purified by treatment with sodium hypochlorite solution it dyes cotton tints of enhanced purity and redder than those produced by the dyestuff not so treated; these tints are also of remarkable fastness.

In manner similar to that described in the first paragraph of this example the 1-carbethoxyamino-8-chloranthraquinone may be converted into the 1-carbethoxyamino-4:8-dichloranthraquinone; this cystallizes from nitrobenzene in the form of slender yellow needles which melt at 205–206° C.; further, from the 1-benzoylamino-8-chloranthraquinone there may be obtained by brominating in nitrobenzene at 40° C. and recrystallizing from epichlorhydrin, the 1-benzoylamino - 4 - bromo - 8 - chloranthraquinone in the form of yellow needles of melting point 215° C. In like manner there can be made 1-acetylamino-4,8-dichloranthraquinone of melting point 218–219° C.

When these products are caused to react with 1-aminoanthraquinone or 1-amino-5-benzoylaminoanthraquinone or 1-amino-4-benzoylaminoanthraquinone or 1-aminoanthraquinone-4,3-acridone or any other 1-aminoanthraquinone, and the body is treated in the manner described in the fourth paragraph of this example with aluminium chloride in combination with pyridine, a dyestuff is obtained which also dyes cotton very fast brown to olive tints.

*Example 2*

1-benzoylamino-4,8-dichloranthraquinone is made in the manner described in paragraph 1 of Example 1.

A mixture of 8 parts of the product thus obtained, 6.9 parts of 1-amino-5-benzoylaminoanthraquinone, 6 parts of anhydrous sodium acetate, 0.4 part of cupric acetate and 200 parts of naphthalene is heated to boiling for about 1 hour in a reflux apparatus. Then 4.5 parts of 1-aminoanthraquinone are added to the mass and boiling is continued for a further 3 hours; the mixture is then diluted gradually with about its own volume of chlorobenzene, filtered at 70–80° C. and the solid matter washed with chlorobenzene, alcohol and water, and then dried. The product thus obtained probably corresponds to the formula

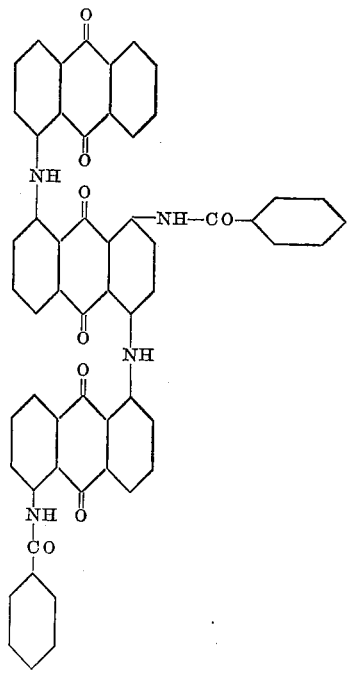

10 parts of the condensation product thus obtained are introduced, while stirring, into a mixture made, while cooling, of 30 parts of aluminium chloride and 30 parts of dry pyridine at a temperature of 80-90° C.; the mass is kept during 2 hours at 140-150° C. and is then introduced into 1500 parts of water which have been made alkaline by the addition of 150 parts by volume of caustic soda solution of 30 per cent. strength. At a temperature of 40° C. there are added 25 parts of sodium hydrosulfite and the whole is filtered from a small quantity of impurities. By blowing air through the filtrate the dyestuff of the probable formula

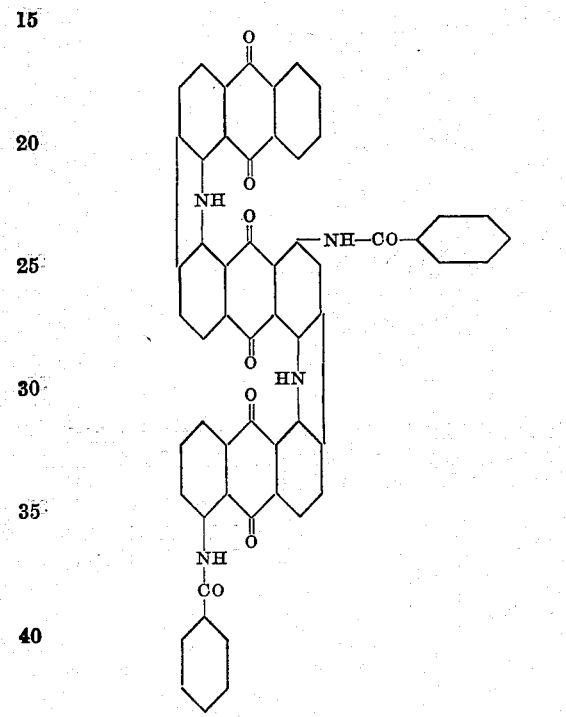

is precipitated; after filtration, washing and drying, it is a black brown powder which dissolves in concentrated sulfuric acid to a blue-grey solution and dyes cotton in a brown red vat yellow brown tints which are very fast.

*Example 3*

1 gram of the dyestuff made as described in paragraph 4 of Example 1 is made into a paste with 5 cc. of caustic soda solution of 36° Bé. and 100 cc. of water at 40°-50° C.; 2 grams of hydrosulfite conc. powder are added and vatting is continued for ½ hour at the above temperature. Into the dye-bath are introduced 3 cc. of caustic soda solution of 36° Bé. and 1 gram of hydrosulfite and water is added to make up to 2 litres when the stock vat is included, and the stock vat is then introduced. The material is entered at 40-50° C., handled for ¼ hour and then there are added 20 grams of sodium chloride or calcined sodium sulfate. Dyeing is continued for 1 hour at 40-50° C., after which the goods are wrung out, oxidized for ½ hour in the air, rinsed and soured, rinsed again and soaped at the boil. Brown red tints are obtained.

What we claim is:—

1. In the manufacture of anthraquinone vat-dyestuffs, the step which consists in causing the products from 1 mol. of 1-acylamino-4,8-dihalogenanthraquinone and 2 mols of 1-aminoanthraquinone to react with agents having a condensing action.

2. In the manufacture of anthraquinone vat-dyestuffs, the step which consists in causing the products from 1 mol. of 1-acylamino-4,8-dichloranthraquinone and 2 mols of 1-aminoanthraquinone to react with agents having a condensing action.

3. In the manufacture of anthraquinone vat-dyestuffs, the step which consists in causing the products from 1 mol. of 1-benzoylamino-4,8-dichloranthraquinone and 2 mols of 1-aminoanthraquinone to react with agents having a condensing action.

4. In the manufacture of an anthraquinone vat-dyestuff, the step which consists in causing the product from 1 mol. of 1-benzoylamino-4:8-dichloranthraquinone and 2 mols of 1-aminoanthraquinone to react with agents having a condensing action.

5. A process for the manufacture of anthraquinone vat-dyestuffs consisting in treating in a first step 1-acylamino-8-halogenanthraquinones with halogenating agents, condensing 1 mol. of the 1-acylamino-4,8-dihalogenanthraquinone so obtained in a second step with 2 mols of 1-aminoanthraquinone, and treating the products so obtained in a third step with agents having a condensing action.

6. A process for the manufacture of anthraquinone vat-dyestuffs consisting in treating in a first step 1-acylamino-8-chloranthraquinones with chlorinating agents, condensing 1 mol. of the 1-acylamino-4,8-dichloranthraquinone so obtained in a second step with 2 mols of 1-aminoanthraquinone, and treating the products so obtained in a third step with agents having a condensing action.

7. A process for the manufacture of anthraquinone vat-dyestuffs consisting in treating in a first step 1-benzoylamino-8-chloranthraquinone with chlorinating agents, condensing 1 mol. of the 1-benzoylamino-4,8-dichloranthraquinone so obtained in a second step with 2 mols of 1-aminoanthraquinone, and treating the products so obtained in a third step with agents having a condensing action.

8. Anthraquinone vat-dyestuffs which are obtained by treating the products of the general formula

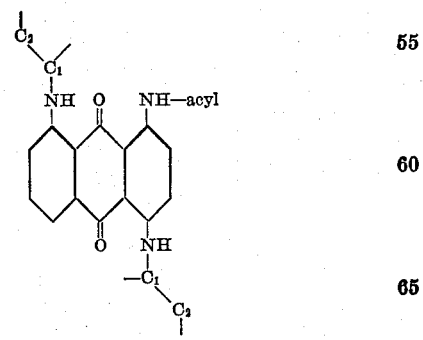

wherein each of the carbon pairs $C_1$ $C_2$ belongs to an anthraquinone nucleus with agents having a condensing action, which products represent dark colored powders dyeing cotton very fast brown to olive tints.

9. Anthraquinone vat-dyestuffs which are obtained by treating the products of the general formula

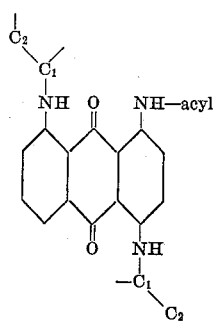

wherein each of the carbon pairs $C_1$ $C_2$ belongs to among themselves identical anthraquinone nuclei, with agents having a condensing action, which products represent dark colored powders dyeing cotton very fast brown to olive tints.

10. Anthraquinone vat-dyestuffs which are obtained by treating the products of the general formula

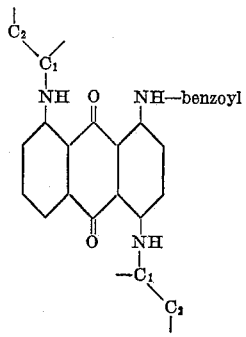

wherein each of the carbon pairs $C_1$ $C_2$ belongs to among themselves identical anthraquinone nuclei, with agents having a condensing action, which products represent dark colored powders dyeing cotton very fast brown to olive tints.

11. The anthraquinone vat-dyestuff which is obtained by treating the product of the formula

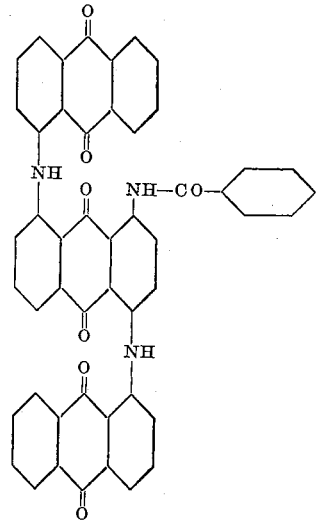

with agents having a condensing action which product represents a dark colored powder dyeing cotton very fast brown tints.

MAX UTZINGER.
MAX BOMMER.